United States Patent
Barrett

(10) Patent No.: US 7,455,582 B2
(45) Date of Patent: Nov. 25, 2008

(54) SOLAR POWERED FAN FOR PORTABLE ENCLOSURE

(76) Inventor: Cory G. Barrett, 25400 N. 500th St., Hume, IL (US) 61932

( * ) Notice: Subject to any disclaimer, the term of this patent is extended or adjusted under 35 U.S.C. 154(b) by 0 days.

(21) Appl. No.: 11/606,058

(22) Filed: Nov. 30, 2006

(65) Prior Publication Data

US 2007/0129002 A1    Jun. 7, 2007

Related U.S. Application Data

(60) Provisional application No. 60/740,627, filed on Nov. 30, 2005.

(51) Int. Cl.
*F24F 7/007* (2006.01)
*E04H 15/14* (2006.01)

(52) U.S. Cl. ............... 454/230; 454/228; 454/900; 416/246; 135/91; 4/477

(58) Field of Classification Search ............ 454/343, 454/354, 900, 228, 230; 416/246; 135/91; 4/477

See application file for complete search history.

(56) References Cited

U.S. PATENT DOCUMENTS

| | | | | |
|---|---|---|---|---|
| 2,281,674 | A * | 5/1942 | Carson | ............ 116/48 |
| D281,274 | S | 11/1985 | Wright | |
| 4,761,840 | A | 8/1988 | Harding | |
| 4,899,645 | A | 2/1990 | Wolfe | |
| 4,922,557 | A | 5/1990 | Harding | |
| 5,078,047 | A | 1/1992 | Wimberly | |
| 5,131,888 | A | 7/1992 | Adkins | |
| 5,507,619 | A * | 4/1996 | Ryan | ............ 416/5 |
| 5,522,704 | A * | 6/1996 | Casteel | ............ 416/246 |
| 5,672,101 | A | 9/1997 | Thomas | |
| 5,725,356 | A * | 3/1998 | Carter | ............ 416/240 |
| 5,934,349 | A * | 8/1999 | Faller | ............ 160/127 |
| D425,192 | S | 5/2000 | Humphrey | |
| 6,306,030 | B1 | 10/2001 | Wilson | |
| 6,402,338 | B1 * | 6/2002 | Mitzel et al. | ............ 362/154 |
| 6,615,414 | B2 | 9/2003 | Miller | |
| 6,814,661 | B2 | 11/2004 | Jardinier | |
| 2003/0116188 | A1 | 6/2003 | Hsieh | |
| 2003/0210140 | A1 | 11/2003 | Menard | |
| 2004/0084071 | A1 * | 5/2004 | Gray | ............ 135/16 |
| 2004/0176021 | A1 | 9/2004 | Mills | |
| 2005/0079113 | A1 | 4/2005 | Selander | |

(Continued)

FOREIGN PATENT DOCUMENTS

FR    2619421 A1 *  2/1989

(Continued)

*Primary Examiner*—Steven B. McAllister
*Assistant Examiner*—Patrick F. O'Reilly, III
(74) *Attorney, Agent, or Firm*—Richard C. Litman

(57) ABSTRACT

The solar powered fan for a portable enclosure includes an electrical fan, which is pivotally mounted within the interior region of a portable edifice, such as that associated with a portable toilet facility. The pivotal mounting of the fan allows for selective user adjustment of the angular position of the fan with respect to the roof of the housing. Mounted on the roof, exterior to the enclosure, is a hollow housing having at least one solar panel mounted to an upper surface thereof. The solar panel charges a rechargeable battery received within the hollow housing which, in turn, is in electrical communication with the electrical fan.

13 Claims, 5 Drawing Sheets

U.S. PATENT DOCUMENTS

2006/0277675 A1 * 12/2006 Tinnell .................... 4/477

FOREIGN PATENT DOCUMENTS

| JP | 3176522 | 7/1991 |
| JP | 10141722 | 5/1998 |
| JP | 2004205051 | 7/2004 |
| WO | WO2004/094738 A1 | 11/2004 |

* cited by examiner

US 7,455,582 B2

SOLAR POWERED FAN FOR PORTABLE ENCLOSURE

CROSS-REFERENCE TO RELATED APPLICATION

This application claims the benefit of U.S. Provisional Patent Application Ser. No. 60/740,627, filed Nov. 30, 2005.

BACKGROUND OF THE INVENTION

1. Field of the Invention

The present invention relates to a solar powered fan for a portable enclosure, which includes an electrical fan pivotally mounted within the interior region of a portable edifice, such as that associated with a portable toilet facility. Particularly, the system includes a solar panel mounted on the roof of the enclosure, which charges a rechargeable battery in electrical communication with the electrical fan.

2. Description of the Related Art

Portable enclosures, such as tool sheds and, in particular, portable toilet facilities, are often positioned in environments where they are exposed to direct sunlight, such as construction sites and the like. The interiors of these enclosures can become quite warm in this sort of environment, which can have negative effects on waste products and volatile compounds stored within the enclosures, particularly in the generation of noxious and offensive fumes. Thus, it is necessary to provide some system for circulating air within the enclosure.

Typical portable toilet facilities include a grating or vent, often formed within the ceiling of the enclosure. Addition of a ventilating fan to the grating or vent provides passage of fresh air from the environment into the interior of the structure. The user, however, does not have control over the direction of the air flow, since the fan is typically stably mounted on the roof of the structure, and the user is not provided with direct access to the fan. It would be preferable to provide the user with control over the direction of air flow provided by the fan, as the source of odoriferous fumes may vary with time and location.

Further, fans and ventilation systems for portable housings are typically permanently mounted to the housing and must be transported along with the enclosure. It would be preferable to provide a fan which is not only portable in and of itself, but adapted for mounting to a wide variety of different structures. Thus a solar powered fan for a portable enclosure solving the aforementioned problems is desired.

SUMMARY OF THE INVENTION

The solar powered fan for a portable enclosure includes an electrical fan, which is pivotally mounted within the interior region of a portable housing, such as that associated with a portable toilet facility. The pivotal mounting of the fan allows for selective user adjustment of the angular position of the fan with respect to the roof of the housing. The fan is mounted to a support arm, which is pivotally joined to a vertical support member. The vertical support member is rotatable about the vertical axis, providing user-selectable positioning of the fan about two axes of rotation.

Mounted on an exterior surface of the enclosure's roof is a hollow housing having at least one solar panel mounted to an upper surface thereof. The solar panel charges a rechargeable battery received within the hollow housing which, in turn, is in electrical communication with the electrical fan. Exposure to environmental light charges the battery via the solar panel, thus allowing the solar powered fan to operate on its own, without a separate external power source.

Further, an adjustable collar is mounted on the vertical support member, within the interior of the enclosure. The collar threadedly engages the vertical support member and may be vertically adjusted to contact the roof of the enclosure, thus stabilizing the solar powered fan with respect to the enclosure's roof.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
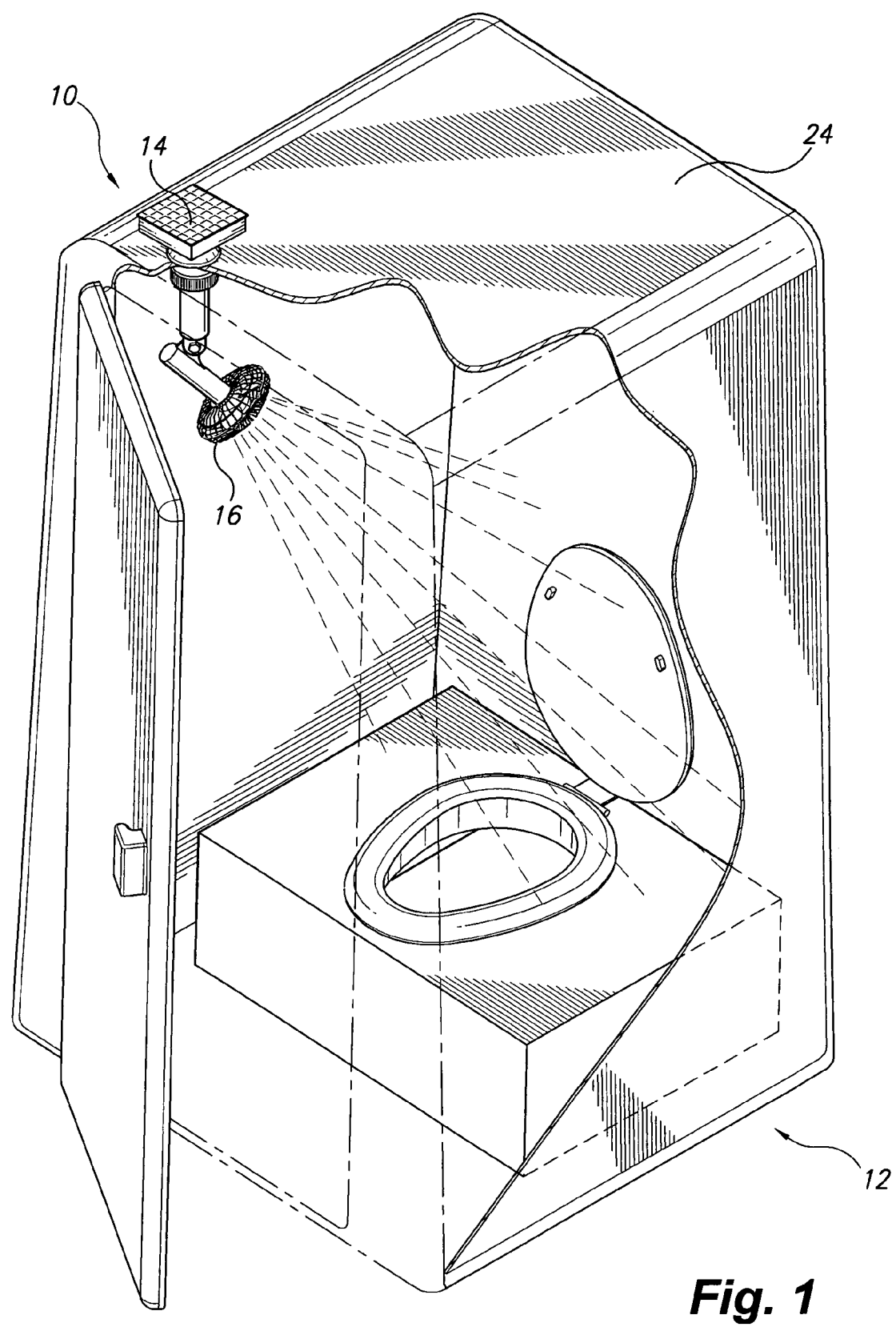
FIG. 1 is an environmental, perspective view of a solar powered fan for a portable enclosure according to the present invention.

FIG. 1 illustrates the subject solar powered fan for a portable enclosure 10 mounted on the roof 24 of a portable shed 12, such as, for example, that associated with portable toilet facilities. As shown, system 10 includes an upper housing which is positioned on roof 24 and projects upwardly therefrom. At least one solar panel 14 is mounted on the upper housing for powering system 10, as will be further described below. Additionally, a fan 16 is pivotally mounted within the interior of enclosure 12, thus providing adjustable air flow within the enclosure 12 for the user. Power for fan 16 is provided by solar panel 14, which is positioned to receive direct sunlight, thus allowing system 10 to be mounted on any suitable enclosure 12, without the necessity of an exterior power source. It should be understood that the portable toilet facility 12 is shown for exemplary purposes only, and that system 10 may be utilized with any desired suitable portable enclosure.

Figure 2:
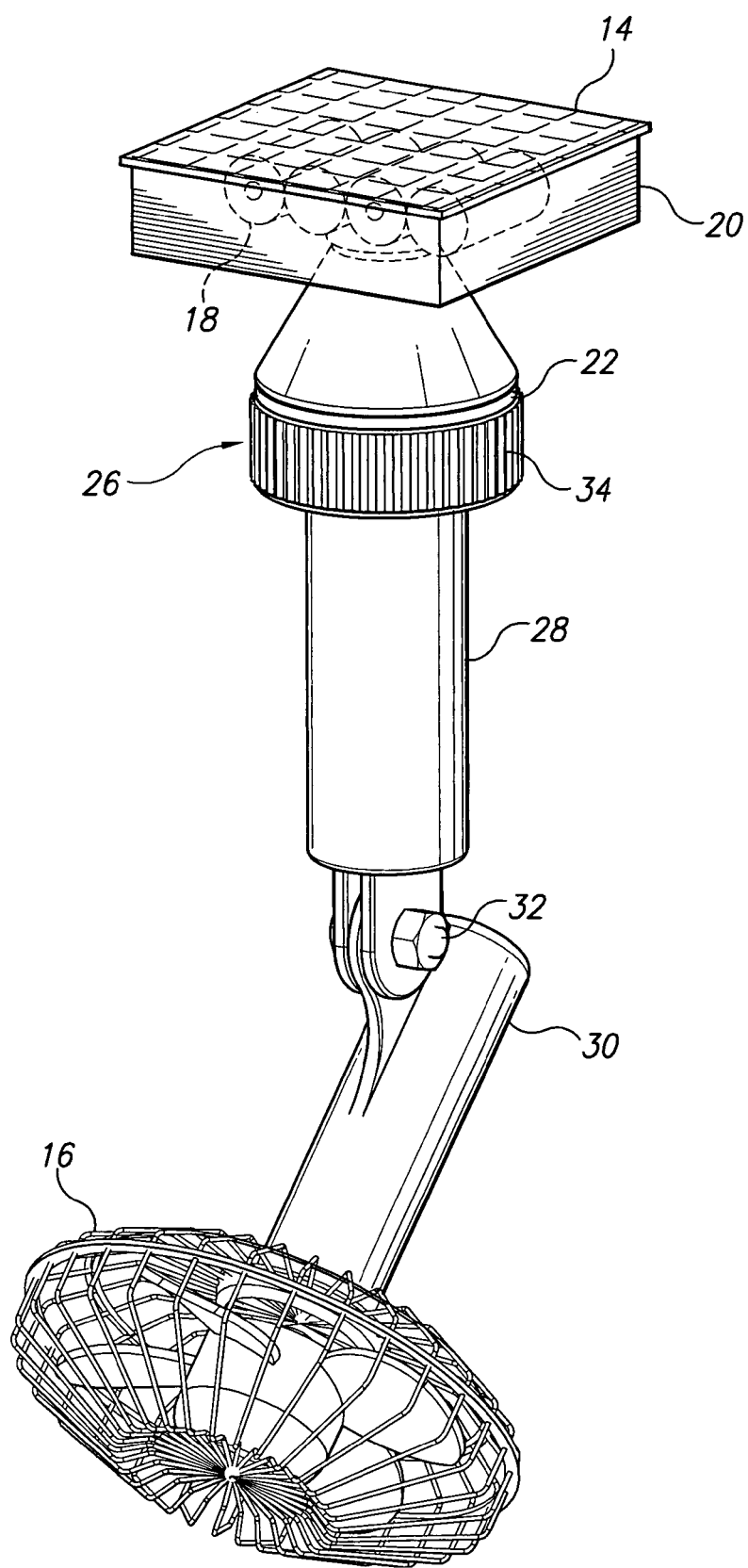
FIG. 2 is a perspective view of the solar powered fan for a portable enclosure according to the present invention.

As best shown in FIG. 2, the solar powered fan for a portable enclosure 10 includes a main housing 20, which defines an open interior region for housing at least one rechargeable battery 18. Main housing 20 is formed from a lightweight resilient material, such as plastic, for example, and may have any size and shape, dependent upon the needs and desires of the user. At least one solar panel 14 is mounted on the upper surface of main housing 20 for charging rechargeable battery 18. Solar panel 14 is in electrical communication with rechargeable battery 18 via wires or the like.

A vertical mount 28 is mounted to the lower surface of main housing 20 and projects downwardly therefrom. The upper portion of vertical mount 28 has a substantially cylindrical contour, and vertical mount 28 is rotationally mounted to the lower surface of main housing 20, such that vertical mount 28 may freely rotate about the vertical axis. Vertical mount 28 may be made of a lightweight resilient material, such as plastic, for example.

An annular gasket 22 and an annular collar 26 are both mounted on vertical mount 28. During installation of system 10, an opening is formed through roof 24 of enclosure 12, with the opening being substantially circular and having a size approximately matching that of the circular cross-section of vertical mount 28. Main housing 20 is positioned on top of roof 24, with annular gasket 22 being positioned between the lower surface of main housing 20 and roof 24. Annular gasket 22 aids in sealing the opening and preventing unwanted fluids, such as rainwater, from entering the opening. Vertical mount 28 is received by the opening in roof 24, such that vertical mount 28 projects downwardly, within the interior of enclosure 12. Once the user selects the proper angular position of fan 16 (to be described in detail below), the user may lock the vertical mount 28 in place with respect to roof 24, through the tightening of collar 26. Collar 26 may include a textured outer surface 34, as shown, providing a gripping surface with an increased frictional coefficient for the user.

Figure 3:
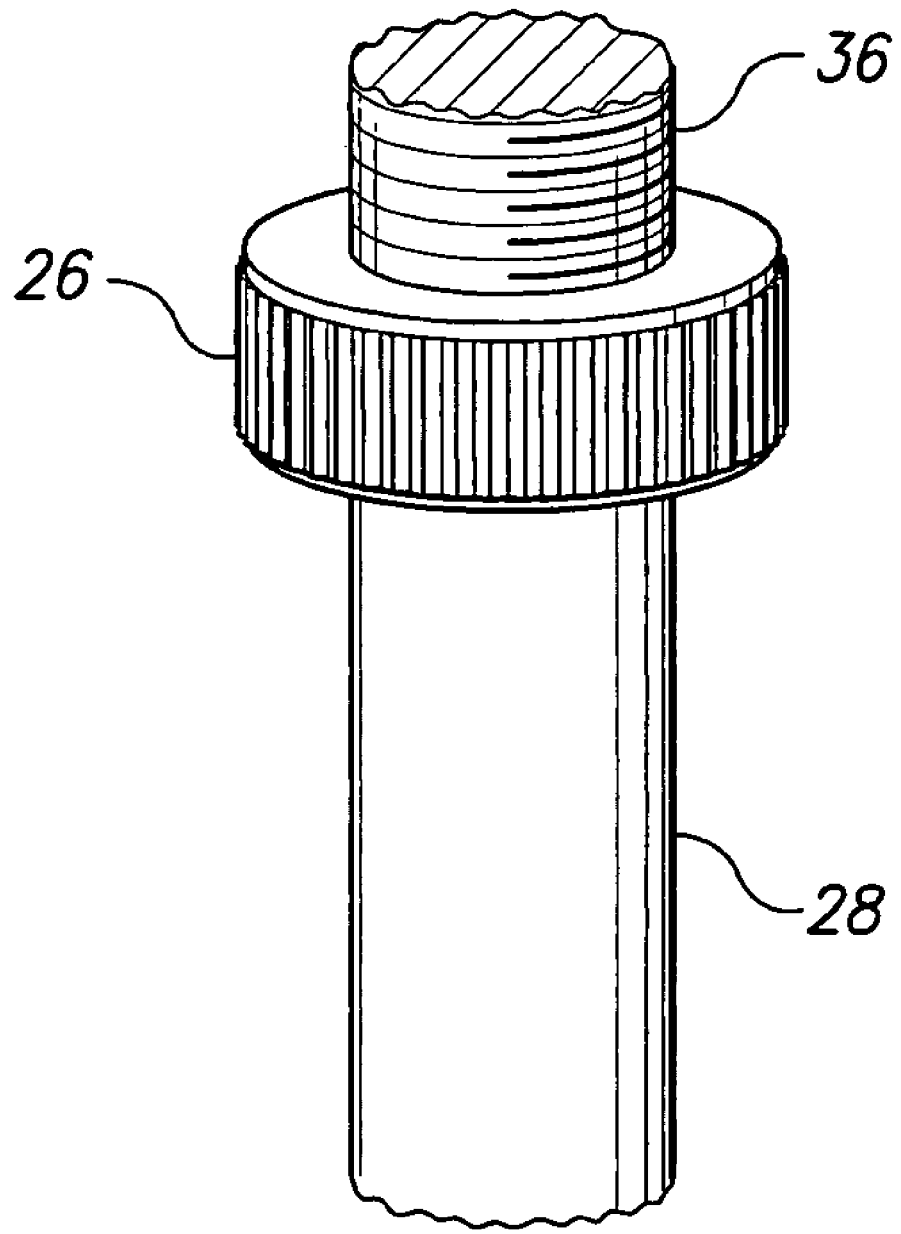
FIG. 3 is a partial perspective view of the adjustable mounting of a collar on a vertical mounting member of the solar powered fan for a portable enclosure according to the present invention.

As best shown in FIG. 3, the upper end of vertical mount 28 includes threads 36, which engage matching threads formed on the interior annulus of collar 26. Collar 26 may be tightened such that collar 26 contacts the underside of roof 24, both locking vertical mount 28 in place, and further securing the mounting of the entire system 10 to roof 24. Further, as an alternative, a locking device could be added to collar 26, allowing the user to selectively and releasably lock the collar 26 to vertical mount 28, preventing the unauthorized removal of the system 10 from the structure 12.

Referring again to FIG. 2, a mounting arm 30 is pivotally mounted to the lower end of vertical mount 28 by a pivotal fixture 32, which may be a pivot pin, screw, bolt or the like. Mounting arm 30 may be formed from a resilient lightweight material, such as plastic. Electrical fan 16 is mounted to the front end of mounting arm 30 and is in electrical communication with rechargeable battery 18. The position of fan 16 is user-adjustable about the vertical axis, via rotation of vertical mount 28, and about a horizontal axis, via rotation of mounting arm 30 about the lower end of vertical mount 28.

Figure 4:
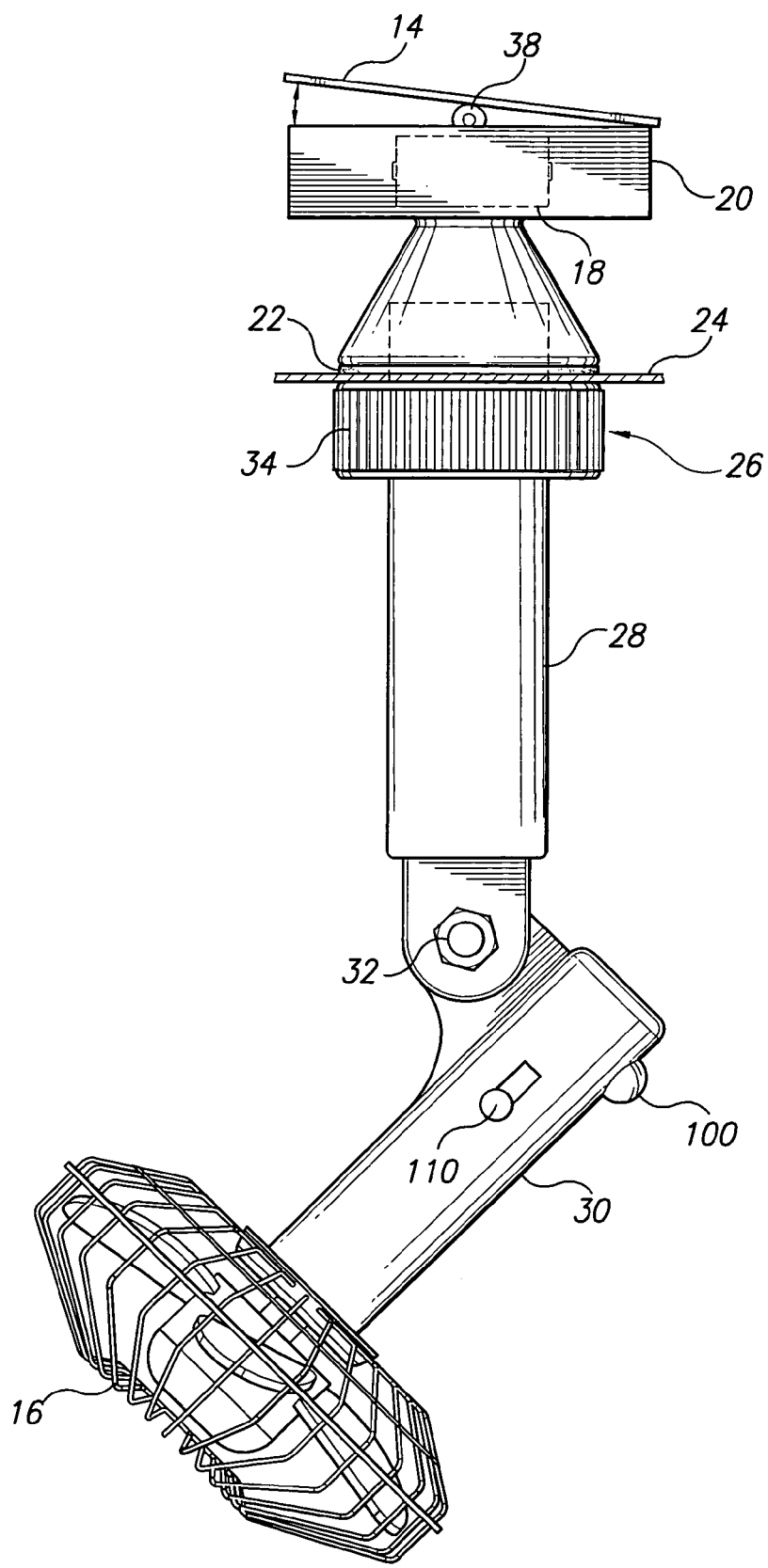
FIG. 4 is a side view of an alternative embodiment of the subject solar powered fan for a portable enclosure, illustrating an adjustable rotational mounting for the solar panel on the upper surface of the main housing.

As illustrated in the alternative embodiment of FIG. 4, the solar panel 14 may be mounted on a rotational mounting structure 38, which could be a wheel, a gear assembly, a bearing mount or the like. The rotational mounting structure 38 is, in turn, mounted to the upper surface of main housing 20. In locations where direct sunlight is not available at all times, it may be necessary to adjust the angular orientation of solar panel 14, to maximize the electromagnetic flux thereon. Rotational mounting structure 38 allows the user to selectively position the solar panel 14 to maximize the amount of light impinging thereon to charge battery 18. Further, the embodiment of FIG. 4 includes a user-actuatable switch 110 for selectively and manually turning fan 16 on and off. It should be understood that any suitable switch assembly may be utilized, dependent upon the needs and desires of the user. Further, the system shown in FIG. 4 includes a light source 100 mounted to a lower portion of mounting arm 30. Light source 100 may be a light bulb, one or more light emitting diodes, or any other suitable light source for providing light to the interior of enclosure 12 when the enclosure 12 is occupied, and when system 10 is activated.

The solar powered fan for portable enclosures 10 is formed from lightweight materials and may be easily assembled, disassembled and transported. Further, the system 10 may be adapted for use with a wide variety of different enclosures and may be easily transferred from one enclosure to another.

Figure 5:
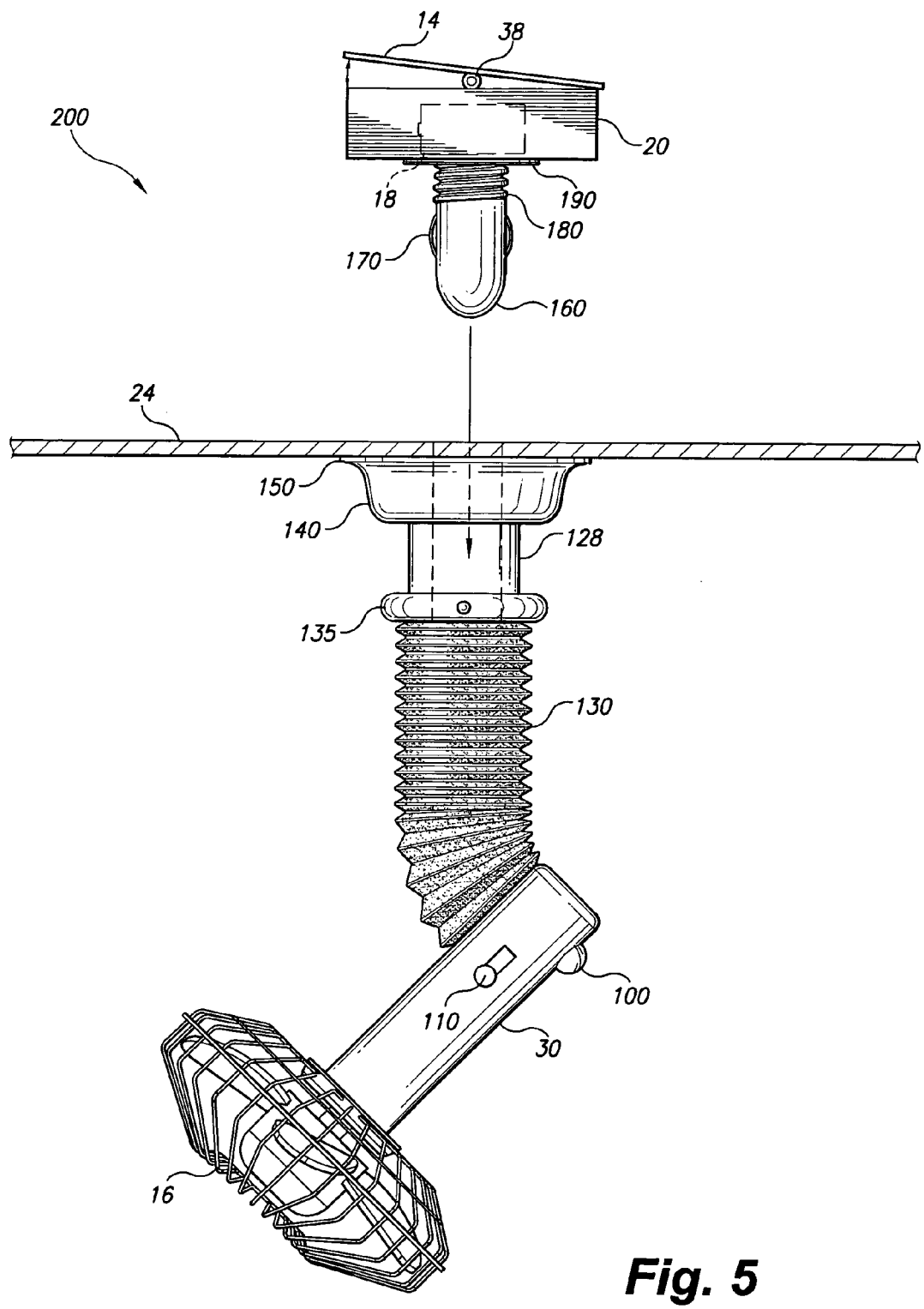
FIG. 5 is a partially exploded, side view of an alternative embodiment of the solar powered fan for a portable enclosure according to the present invention.

In the alternative embodiment of FIG. 5, system 200 includes a flexible tube or pipe 130, which replaces the lower portion of vertical mount 28 in the embodiments of FIGS. 2 and 4. The flexible tube 130 has opposed upper and lower ends, with the lower end thereof being joined to the mounting arm 30. The upper end of flexible pipe 130 is secured to upper shaft 128, which is formed from a substantially rigid material, such as hard plastic or the like. Thus, selective rotation and positioning of fan 16 is performed through selective flexing and deformation of flexible tube 130 with respect to the upper shaft portion 128.

A motion sensor 135 may be mounted between upper shaft portion 128 and the upper end of flexible tube 130, as shown, for actuating fan 16 when a user is present within enclosure 12, and deactuating fan 16 when the enclosure 12 is unoccupied. Motion sensor 135 may be an infrared-type sensor, an acoustic-type sensor, or any other suitable motion sensor, dependent upon the needs and desires of the user. The user may also manually actuate and deactuate the fan 16 through switch assembly 110, as described above.

Adjustable collar 26 of FIG. 4 may be replaced with a coupler 140, as shown in FIG. 5, which may be releasably secured to roof 24 through the use of any suitable releasable fastener, dependent upon the needs and desires of the user. Coupler 140 includes a female recess or cavity for receiving and engaging male insert portion 160. Coupler 140 includes an end portion 150 that engages the lower surface of the enclosure 24. The system 200 of FIG. 5 includes a housing 20 similar to that described above with reference to FIGS. 1-4, with male insert portion 160 being mounted to a bottom surface thereof and projecting downwardly therefrom. Gasket 190 may be positioned between the male insert portion 160 and the bottom surface of housing 20, as shown.

Wires or contacts 170 are mounted on male insert portion 160 and, when fully assembled, electrically join the solar panel 14, rechargeable batteries 18 and fan 16, through contact with electrical leads positioned within coupler 140. Further, male insert portion 160 may have threads 180 formed thereon for releasable threaded connection with complementary threads formed within coupler 140.

It is to be understood that the present invention is not limited to the embodiment described above, but encompasses any and all embodiments within the scope of the following claims.

I claim:

1. A solar powered fan for a portable enclosure, comprising:

a main housing having an upper surface and a lower surface, said main housing having a hollow interior region formed therein;

at least one rechargeable battery received within said hollow interior region of said main housing;

at least one solar panel mounted on said upper surface of said main housing, said at least one solar panel being in electrical communication with said at least one rechargeable battery;

a vertical mounting member having an upper end and a lower end, said upper end including means for securing said mounting member to said lower surface of said main housing and projecting downwardly therefrom;

a gasket having a substantially annular contour, said gasket being mounted on said vertical mounting member adjacent said upper end thereof;

a pivoting arm having a proximal end and a distal end, said distal end being mounted on said lower end of said vertical mounting member;

an electrical fan being mounted on said proximal end of said pivoting arm and being selectively angularly positionable by the user, said electrical fan being in electrical communication with said rechargeable battery, whereby said main housing is positioned on an exterior surface of a roof of said portable enclosure with said gasket being sandwiched between said lower surface of said main housing and said exterior surface of said roof, and said vertical mounting member securing means includes a portion thereof projecting through an opening formed in said roof and projecting into an interior of said lower surface of said main housing, wherein said securing means further includes an annular collar vertically adjustably mounted on said vertical mounting member to engage the underside of said roof and secure said vertical mounting member and said housing to said roof.

2. The solar powered fan for a portable enclosure as recited in claim 1, wherein said vertical mounting member is rotatively mounted to said lower surface of said main housing, said vertical mounting member being rotatable about the vertical axis.

3. The solar powered fan for a portable enclosure as recited in claim 1, further comprising means for selectively actuating said electrical fan.

4. The solar powered fan for a portable enclosure as recited in claim 3, wherein said means for selectively actuating said electrical fan includes a user-actuatable switch.

5. The solar powered fan for a portable enclosure as recited in claim 3, wherein said means for selectively actuating said electrical fan includes a motion sensor.

6. The solar powered fan for a portable enclosure as recited in claim 1, further comprising a light source mounted to said pivoting arm, said light source being in electrical communication with said at least one rechargeable battery.

7. The solar powered fan for a portable enclosure as recited in claim 1, further comprising means for rotatably mounting said solar panel to said housing.

8. A solar powered fan for a portable enclosure, comprising:

a main housing having an upper surface and a lower surface, said main housing having a hollow interior region formed therein, said main housing including a male insert member formed on the lower surface and projecting downwardly therefrom;

at least one rechargeable battery received within said hollow interior region of said main housing;

at least one solar panel mounted on said upper surface of said main housing, said at least one solar panel being in electrical communication with said at least one rechargeable battery;

a vertical mounting member having an upper end and a lower end, said upper end being secured to said lower surface of said main housing and projecting downwardly therefrom, said upper end including a female recess formed therein;

a gasket having a substantially annular contour, said gasket being mounted on said lower surface of said housing member and about said male insert member;

a pivoting arm having a proximal end and a distal end, said distal end being mounted on said lower end of said vertical mounting member; and an electrical fan being mounted on said proximal end of said pivoting arm and being selectively angularly positionable by the user, said electrical fan being in electrical communication with said rechargeable battery, whereby said main housing is positioned on an exterior surface of a roof of said portable enclosure with said gasket being sandwiched between said lower surface of said main housing and said exterior surface of said roof, and said male insert member projecting through an opening formed in said roof and projecting into an interior of said portable enclosure and engaging said female recess thereby placing said upper end of said vertical mounting member contiguous to the interior surface of the roof.

9. The solar powered fan for a portable enclosure as recited in claim 8, wherein said vertical mounting member has an upper portion and a lower portion, said lower portion being formed from a flexible tube, whereby the user may selectively position said electrical fan with respect to the upper portion of said vertical mounting member.

10. The solar powered fan for a portable enclosure as recited in claim 8, further comprising means for releasably securing the male insert member within the female recess.

11. The solar powered fan for a portable enclosure as recited in claim 10, wherein said means for releasably securing the male insert member within the female recess comprises a threaded connection.

12. The solar powered fan for a portable enclosure as recited in claim 8, further comprising means for adjustably and releasably securing the upper portion of said vertical mounting member to said roof of said portable enclosure.

13. The solar powered fan for a portable enclosure as recited in claim 8, further comprising means for rotatably mounting said solar panel to said housing.

\* \* \* \* \*